(12) United States Patent
Kothuvatiparambil et al.

(10) Patent No.: US 9,424,344 B2
(45) Date of Patent: Aug. 23, 2016

(54) METHOD AND APPARATUS FOR NATURAL LANGUAGE SEARCH FOR VARIABLES

(71) Applicant: Bank of America Corporation, Charlotte, NC (US)

(72) Inventors: Viju Kothuvatiparambil, Seattle, WA (US); Ramakrishna R. Yannam, Seattle, WA (US)

(73) Assignee: Bank of America Corporation, Charlotte, NC (US)

( * ) Notice: Subject to any disclaimer, the term of this patent is extended or adjusted under 35 U.S.C. 154(b) by 293 days.

(21) Appl. No.: 14/271,571

(22) Filed: May 7, 2014

(65) Prior Publication Data

US 2015/0324455 A1      Nov. 12, 2015

(51) Int. Cl.
*G06F 17/30* (2006.01)

(52) U.S. Cl.
CPC ...... *G06F 17/30654* (2013.01); *G06F 17/3053* (2013.01); *G06F 17/30554* (2013.01)

(58) Field of Classification Search
USPC ................................................ 707/716, 723
See application file for complete search history.

(56) References Cited

U.S. PATENT DOCUMENTS

| | | | |
|---|---|---|---|
| 7,447,683 B2 * | 11/2008 | Quiroga | G06F 17/30654 |
| 7,685,116 B2 | 3/2010 | Pell et al. | |
| 2005/0138018 A1 | 6/2005 | Sakai et al. | |
| 2006/0224566 A1 | 10/2006 | Flowers et al. | |
| 2007/0112803 A1 * | 5/2007 | Pettovello | G06F 17/30094 |
| 2009/0210631 A1 * | 8/2009 | Bosworth | H04L 67/10 |
| | | | 711/141 |
| 2011/0055268 A1 | 3/2011 | Sheu | |

* cited by examiner

*Primary Examiner* — Hung T Vy
(74) *Attorney, Agent, or Firm* — Weiss & Arons LLP; Michael A. Springs, Esq.

(57) ABSTRACT

A method for natural language search for variables is provided. The method may include searching an index using key words from a user's natural language question and the context of the user's question. The index may reference variables and/or web service calls in a domain model. The method may also include saving documents obtained in response to the search. The method may also include mapping each of the documents as a node into an object graph. Each node may be associated with a parent node, except when the node is a root node. The method may also include identifying the root node of each document. The method may also include identifying the path of each node from the node to the node's root node. The method may also include identifying matching paths. Each matching path may provide an answer to the user's question.

16 Claims, 5 Drawing Sheets

METHOD AND APPARATUS FOR NATURAL LANGUAGE SEARCH FOR VARIABLES

FIELD OF TECHNOLOGY

This invention relates to natural language search for variables.

BACKGROUND OF THE DISCLOSURE

Natural language queries and searches allow users to interact with computers using regularly-used languages, such as English, French, Spanish, etc. Natural language queries and searches are becoming more popular, because they enable humans to interact with computers in a user-friendly manner.

Natural language queries and searches may typically be implemented in many different electronic environments. They may be used in calling systems, where a user calls an organization, and speaks to an electronic answering system. The electronic answering system has the ability to decipher natural language queries, and can provide answers to the user's questions and requests.

Additionally, natural language queries and searches may be used in internet searches. In many internet search engines, users have the capability to type a question in the user's regular spoken language. The search engine has the ability to decipher the natural language question, and can provide answers to the user's natural language questions.

Natural language queries can also be used to receive information from databases, and many other collections of data.

It is very important that the information a user receives in response to a natural language question be accurate, in addition to being received in a timely manner. Increased accuracy, and increased time efficiency improve a user's overall experience with an electronic information system.

Therefore, it would be desirable to create algorithm(s) which increase accuracy of a response to a natural language query in addition to increasing the speed of the response to the natural language question.

SUMMARY OF THE INVENTION

An apparatus for natural language search for variables, substantially as shown in and/or described in connection with at least one of the figures, as set forth more completely in the claims is provided. The apparatus may include a processor. The processor may be configured to search an index. The index may contain information which references variables and/or methods. The search may use key words from a user's natural language question. The search may also use the context of the user's question. The processor may also be configured to save a plurality of documents obtained in response to the search of the index.

The processor may be further configured to map each of the documents as a node into an object graph. Each node may have one or more parent nodes, unless the node is a root node.

The processor may be further configured to identify the root node of each document.

The processor may be further configured identify the path of each node to the node's root node. In one embodiment, the checking account routing number may be associated with the checking account node. In this embodiment, such a path may include for example, the node, which may be a checking account routing number node, the next node, which may be the parent node of the node, which may be a checking account node, the next node, which may be the parent node of the node checking account node, which may be the customer node, which may be the root node.

In another embodiment, the checking account may be associated with the user's home equity line. The path may include for example, the node, which may be a checking account routing number node, the next node, which may be the parent node of the node, which may be the home equity line node, the next node, which may be the parent node of the home equity line node which may be the customer node, which may be the root node.

The processor may be further configured to identify matching paths. Each matching path may provide an answer to the user's question, but each matching path may contain a discrete path of nodes.

The processor may be further configured to filter out paths depending on a user's criterion. The criterion may include a weighting factor specifying how critical receiving information at a high speed is to the user. The criterion may also include a weighting factor specifying how important receiving accurate information is to the user. The criterion may also include a weighting factor specifying the amount of space the user's electronic environment has available at the time the user wishes to receive the answer to his or her question.

The processor may be further configured to rank the remaining paths.

The processor may be further configured in response to the ranking and filtering, to display the best path, and/or answer, to the user.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
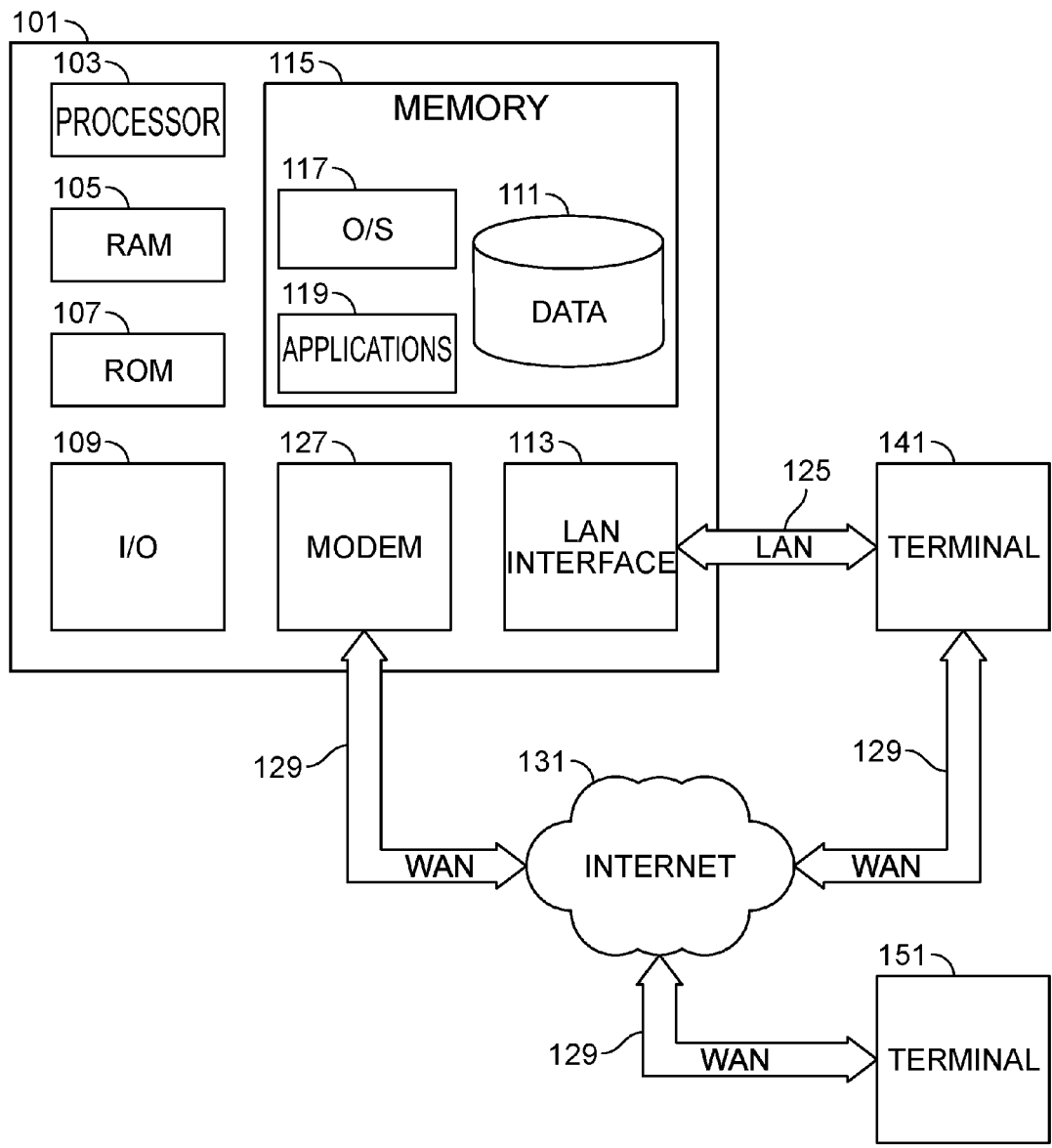
FIG. 1 shows an illustrative apparatus in accordance with principles of the invention.

Apparatus and methods for natural language search for variables is provided. Such apparatus and methods may include hardware and software that can communicate with a user and also have the ability to decipher natural language queries and searches.

The apparatus may include a processor. The processor may be configured to search an index. The index may contain information which may reference variables and/or methods. The search may use key words desired from a user's natural language question. The search may also use the context of the user's question. The processor may be further configured to save a plurality of documents obtained in response to the search of the index.

The processor may be further configured to map each of the documents as a node into an object graph. Each node may be associated with a parent node, except when the node is a root node.

The processor may be further configured to identify the root node of each document.

The processor may be further configured to identify the path of each node form the node to node's root node. The path may comprise a plurality of nodes that connect the node to the root node.

The processor may be further configured to identify a plurality of matching paths. Each of the matching paths may provide an answer to the user's natural language question. Each of the matching paths may also contain a discrete path of nodes.

The processor may be further configured to filter out paths depending on a set of the user's pre-determined criterion.

The processor may be further configured to rank the remaining paths. The ranking may be based in part on the scoring of the items in the index which the documents were retrieved from. The ranking may also be based in part on how many nodes existed in the path. The ranking may also be based in part on the length of the path.

The apparatus may also include a display. The processor may be configured to display, in response to the filtering and ranking, a selected path to the user.

The processor may be further configured to prompt the user for additional information if the processor is unable to determine a specific answer to the user's question.

The processor may be further configured, in response to the user's answer, to rank the paths, and cause the display to display the highest ranking path to the user.

Each node in the graph may have an identification number. Each document in the index may also have an identification number. In addition, the identification numbers of the nodes in the graph and the documents in the search index may be identical.

The processor may also be configured to display more than one path and/or answer if the processor is unable to determine a specific answer to the user's question.

The paths may be ranked in a number of different ways. The paths may be ranked at least in part by the search engine. The paths may also be ranked at least in part by how many nodes existed in the path. The paths may also be ranked at least in part by metadata associated with the documents. Such metadata may include the user's electronic location. The paths may also be ranked at least in part by the length of the paths or in any other suitable fashion. The selected path is the highest ranking path. The selected path may be the most suitable to display to the user, either because it corresponds best to the user's criterion, or because it had a relatively higher score when retrieved from the search engine, or for any other suitable reason.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software/firmware embodiment or an embodiment combining software, firmware, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, EEPROM, Flash memory, SRAM, DRAM, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media—e.g., air and/or space.

FIG. 1 is an illustrative block diagram of mobile device system 100 based on a computer 101. The computer 101 may have a processor 103 for controlling the operation of the mobile device and its associated components, and may include RAM 105, ROM 107, input/output module 109, and a memory 115. The processor 103 will also execute all software running on the computer—e.g., the operating system. Other components commonly used for computers such as EEPROM or Flash memory or any other suitable components may also be part of the mobile device computer 101.

The memory 115 may be comprised of any suitable permanent storage technology—e.g., a hard drive. The memory 115 stores software including the operating system 117 any application(s) 119 along with any data 111 needed for the operation of the mobile device system 100. Alternatively, some or all of mobile device computer executable instructions may be embodied in hardware or firmware (not shown). The computer 101 executes the instructions embodied by the software to perform various functions.

Input/output ("I/O") module may include connectivity to a microphone, keyboard, touch screen, and/or stylus through which a user of computer 101 may provide input, and may also include one or more speakers for providing audio output and a video display device for providing textual, audiovisual and/or graphical output.

Mobile device system 100 may be connected to other mobile device systems via a LAN interface 113.

Mobile device system 100 may operate in a networked environment supporting connections to one or more remote computers, such as terminals 141 and 151. Terminals 141 and 151 may be personal computers or servers that include many or all of the elements described above relative to mobile device system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server.

Any of various conventional web browsers can be used to display and manipulate data on web pages.

Additionally, application program(s) 119, which may be used by computer 101, may include computer executable instructions for invoking user functionality related to communication, such as email, Short Message Service (SMS), and voice input and speech recognition applications.

Computer 101 and/or terminals 141 or 151 may also be mobile devices including various other components, such as a battery, speaker, and antennas (not shown).

Terminal 151 and/or terminal 141 may be portable devices such as a laptop, cell phone, Blackberry™, or any other suitable device for storing, transmitting and/or transporting relevant information. Terminals 151 and/or terminal 141 may be other mobile devices. These mobile devices may be identical to mobile device system 100 or different. The differences may be related to hardware components and/or software components.

Figure 2:
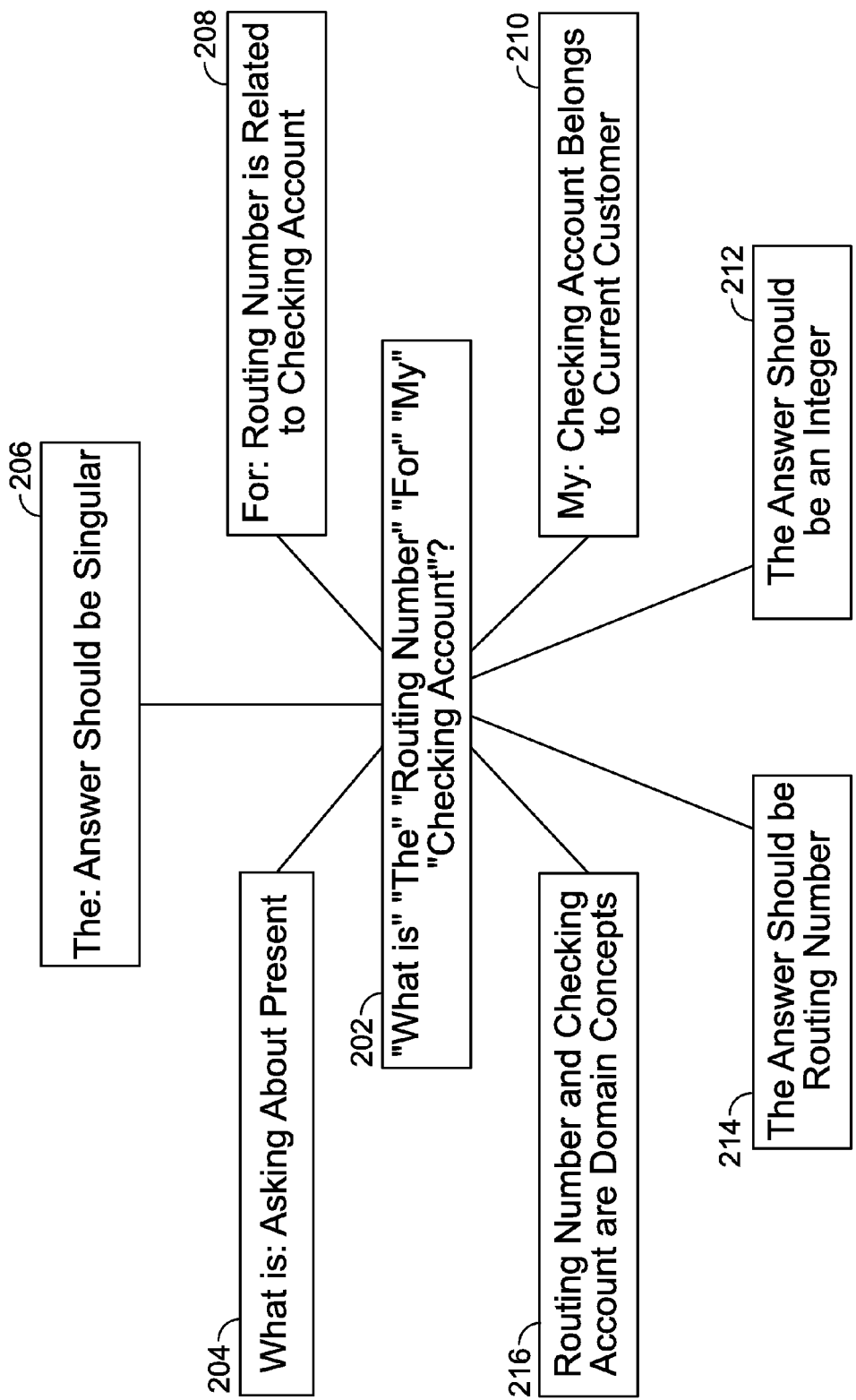
FIG. 2 shows an illustrative flow chart in accordance with principles of the invention.

FIG. 2 shows an analysis of a natural language question. Natural language question 202 depicts a typical user question, in which the user would like to know the routing number to his checking account. Analysis box 204 shows that the words "what is", which are in present tense, connote that the user is asking about the present tense. Analysis box 206 shows that since the words "routing number" are in singular form, thus the answer should be singular. Analysis box 208 shows that since the words "checking account" appear near the words "routing number", the routing number is related to the checking account. Analysis box 210 shows that the word "my", which appears before the words "checking account" connotes that the checking account belongs to the current customer. Analysis box 212 shows that the words "routing number", specifically the word "number", implies that the answer should be a number or integer. Analysis box 214 shows that the words "routing number" which follow the words "what is the" connotes that the answer to the question should be a routing number. Analysis box 216 shows that the words "routing number" and "checking account" are the domain concepts. Domain concepts may be understood to be entities and the relationships between them under the conditions existent at the interface between the entities.

Figure 3:
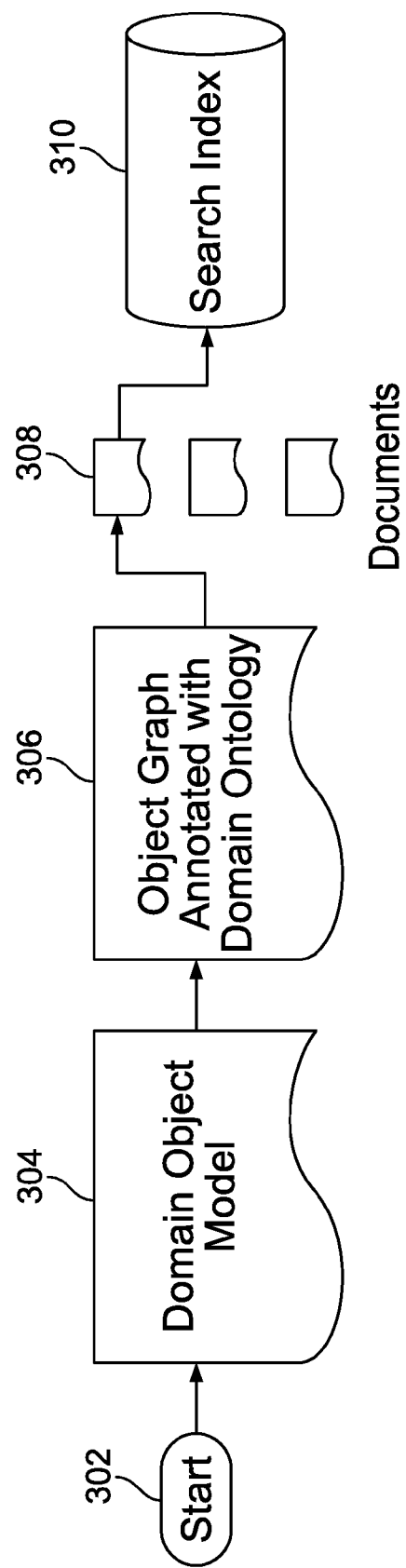
FIG. 3 shows an illustrative flow chart in accordance with principles of the invention.

FIG. 3 shows the transformation and indexing of the documents. Step 302 shows the start of the process. Step 304 shows the domain object model. A domain object model is an object oriented model that represents the key concepts, their attributes and relationships in the problem domain. Step 306 shows the object graph annotated with domain ontology. Domain ontology can be understood as the word, idea, or system, and the relationship between them. Step 308 shows the documents which may be received from a provider. Step 310 shows the search index which will allow for searching and ranking of the documents.

Figure 4:
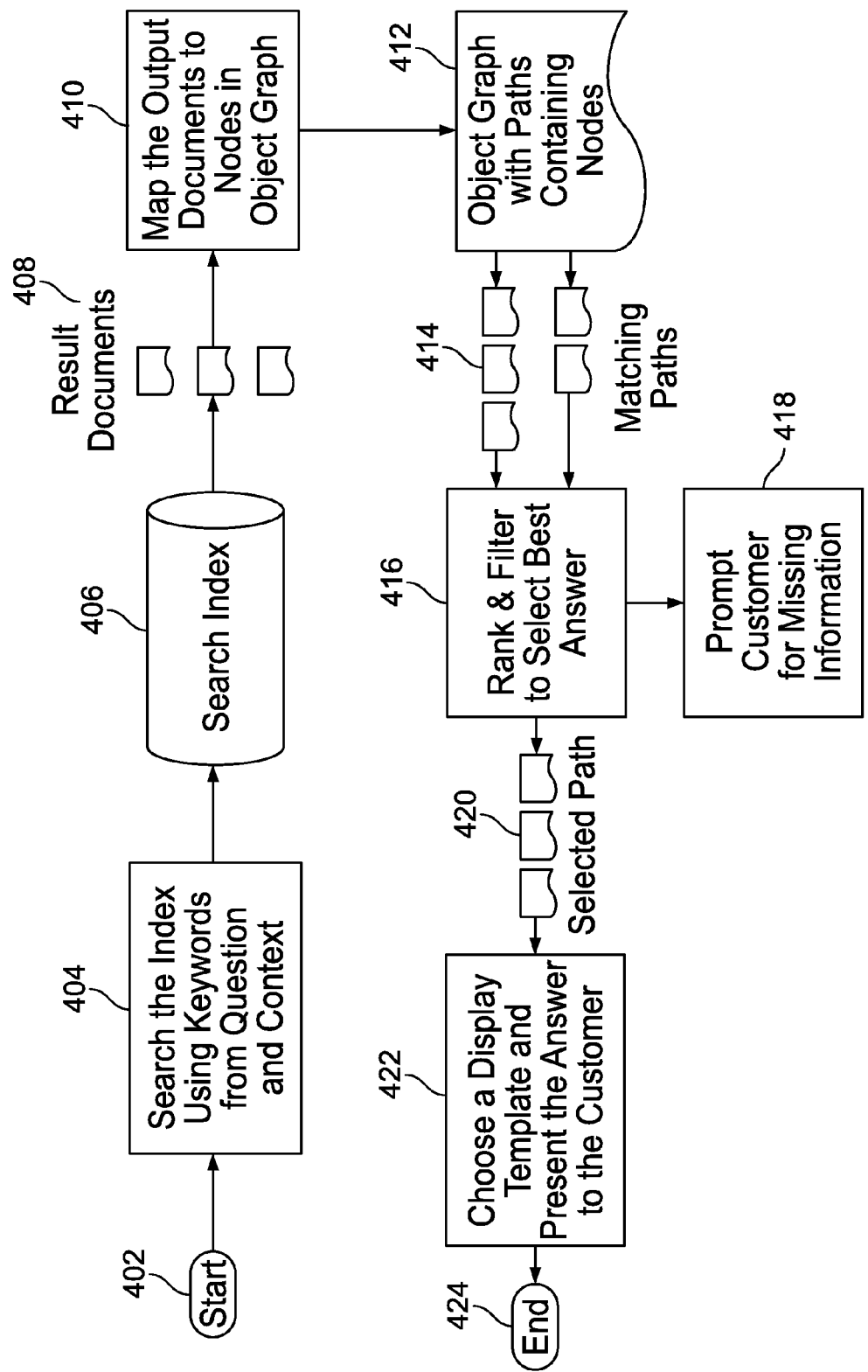
FIG. 4 shows an illustrative flow chart in accordance with principles of the invention.

FIG. 4 shows searching and ranking of the documents. Step 402 shows the start of the process. Step 404 shows searching of a dynamically generated domain model using an index. The searching may use keywords from the user's natural language question and the context of the user's natural language question. Step 406 shows the searching of the index. Steps 404 and 406 may be outsourced to an external software company that possesses the capability to search using an index and provide retrieved documents 408. Step 408 shows the retrieved documents which were obtained in response to the searching of a domain model using an index.

Step 410 shows mapping the resultant or output documents as nodes into an object graph. For example, a routing number node may be related to an account node, which may be related to the base node, or object, which may be the customer object. Step 412 shows an object graph with paths containing nodes. At this step, the system identifies the each node's root node. In addition, the system identifies the path of nodes which connects the node to the root node.

Step 414 shows the matching paths. Matching paths are paths which consist of a discrete path of nodes, and possess the same root node. Step 416 shows the ranking and filtering of the paths, which include the answer to the user's question. The ranking and filtering process may select a path to provide to user with the desired answer.

In an exemplary embodiment, the user may ask a natural language question such as "What is the last check number that was cashed in my checking account?" The system then performs an analysis which determines that the user is asking for a check number. The system also determines that the check is associated with the user's checking account. The system may also determine that the customer is referring to his own personal checking account.

The system then uses the natural language question to conduct a search based on an index. The search then provides the system with documents that were retrieved in response to the search.

The system may create an object graph, in order to map the results, from object models in memory. The object model may be the customer object. The object graph may be loaded into main memory.

The system maps the documents, which were retrieved as a result of the search, as nodes into the object graph. The retrieved documents may be the user's checking account node, the user's most recent check node, the routing number node, the user's savings account node, etc. Instead of the documents themselves, the nodes may be addresses which indicate where to retrieve the documents.

The system may identify the root node of each node, and the path of nodes between the node in the graph and the root node. The system may assert that the root node is the customer node. Any path in which the root node is the customer node may be a matching path. The path from the checking account node to the root node may be one of the matching paths. Any paths which do not have the customer node as the root node may be filtered out. The paths may be ranked based on a combination of elements, which has been described in more detail herein. After the filtering and ranking of the paths, the selected path—e.g., the path that may be most useful and efficient in the specific use case—can be displayed to the user.

The ranking and filtering may be based on a combination of elements. The elements may include how many nodes matched in the path. The elements may also include a score which was provided by the software which searched the domain model using the index.

Step 418 shows if the answer to the user's question is ambiguous—e.g. the user asked for his routing number and the user has more than one routing number—the system may prompt the user for the missing information—e.g. which account would you like the routing number for, the checking, or the savings.

Step 420 shows the best path which contains the answer to the user question. Step 422 shows the system choose a display template, or a means of displaying the answer to the user, and present the answer to the user or customer. Step 424 shows the end of the process.

Figure 5:
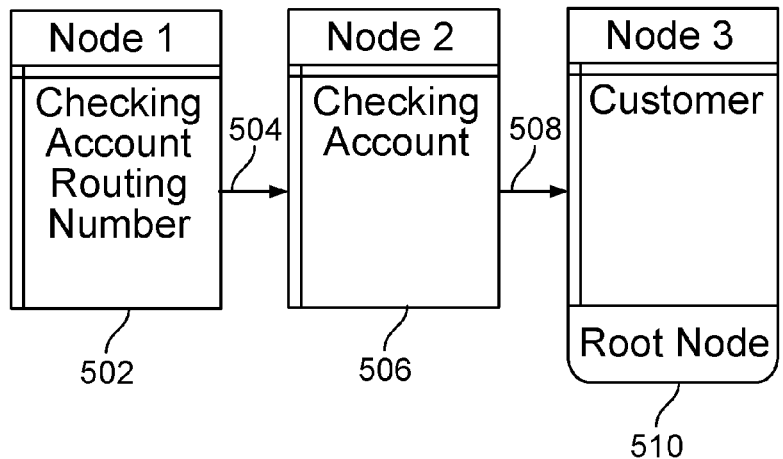
FIG. 5 shows an illustrative flow chart in accordance with principles of the invention.

FIG. 5 shows an example of a matching path. Lead line 502 references node 1. Node 1 may be the checking account routing number node. Node 2, referenced by lead line 506, may be the checking account node. Arrow 504 shows that Node 2 may be the parent node of node 1. Node 3, referenced by lead line 510 may be the customer node. Node 3 may also be the root node. Arrow 508 shows that Node 3 may be the parent node of node 2.

Figure 6:
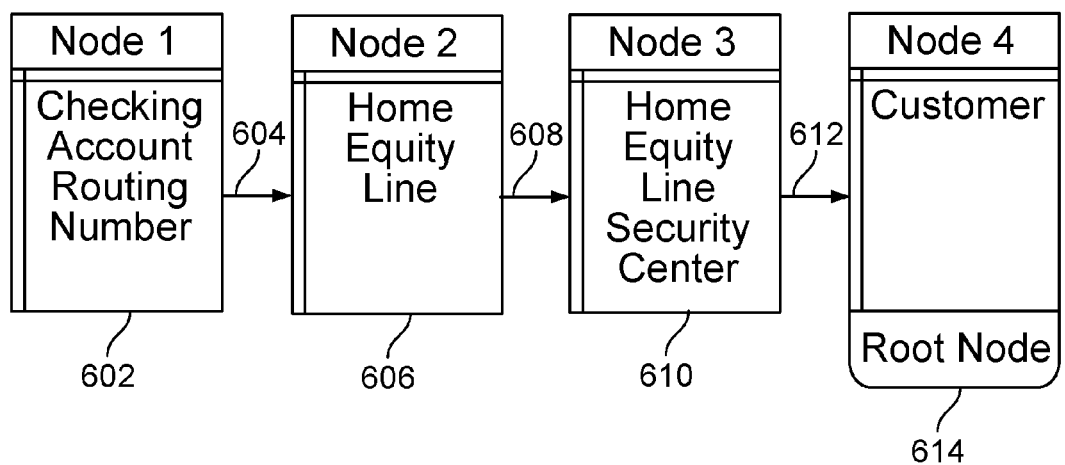
FIG. 6 shows an illustrative flow chart in accordance with principles of the invention.

FIG. 6 shows an example of a matching path. Lead line 602 references node 1. Node 1 may be the checking account routing number node. Node 2, referenced by lead line 606, may be the home equity line node. Arrow 604 shows that Node 2 may be the parent node of node 1. Node 3, referenced by lead line 610 may be the home equity line security center node. Arrow 608 shows that Node 3 may be the parent node of node 2. Node 4, referenced by lead line 614 may be the customer node. Arrow 612 shows that Node 4 may be the parent node of Node 3. In the embodiment described in FIG. 6 the checking account routing number may be processed using high security measures. The high security measures may delay the receipt of the documents. For example, the home equity line security center node may delay the processing of the matching path.

Thus, methods and apparatus for integrating a dynamic token generator into a mobile device have been provided. Persons skilled in the art will appreciate that the present invention can be practiced in embodiments other than the described embodiments, which are presented for purposes of illustration rather than of limitation, and that the present invention is limited only by the claims that follow.

What is claimed is:

1. An apparatus for performing a natural language search, the apparatus comprising:
    a processor configured to search an index, said index contains information which references a domain model, using key words from a user's natural language question and the context of the user's question, and to save a plurality of documents obtained in response to the search of the index;
    the processor further configured to map each of the documents as a node into an object graph, wherein each node is associated with a parent node, except when the node is a root node;
    the processor further configured to identify the root node of each document;
    the processor further configured to identify the path of each node from the node to the node's root node, wherein said path comprises a plurality of nodes that connect the node to the root node;
    the processor further configured to identify a plurality of matching paths, each of said matching paths, wherein each matching path provides an answer to the user's natural language question, each of said plurality of paths that comprises a discrete path of nodes;
    the processor further configured to filter out paths depending on a set of the user's pre-determined criterion;
    the processor further configured to rank the remaining paths; and
    a display configured to display, in response to the filtering and ranking, a selected answer to the user.

2. The apparatus of claim 1, wherein the processor is further configured to prompt the user for additional information if the processor is unable to determine a specific answer to the user's question.

3. The apparatus of claim 2, wherein, in response to the user's answer, the processor is configured to rank the paths, and cause the display to display the highest ranking answer to the user.

4. The apparatus of claim 1, wherein the each node in the graph has an id number; and each document in the index has an identification number, and the identification numbers of the documents in the graph and in the search index are identical.

5. The apparatus of claim 1, wherein the processor is further configured to display more than one answer if the processor is unable to determine a specific answer to the user's question.

6. The apparatus of claim 1, wherein the paths may be ranked at least in part by the search engine.

7. The apparatus of claim 1, wherein the paths may be ranked at least in part by how many nodes existed in the path.

8. The apparatus of claim 1, wherein the paths may be ranked at least in part by the length of the path.

9. One or more non-transitory computer-readable media storing computer-executable instructions which, when executed by a processor on a computer system, perform a method for natural language searching comprising:
    searching an index using key words from a user's natural language question and the context of the user's question, said index contains information which references a domain model;
    saving a plurality of documents obtained in response to the search of the index;
    mapping each of the documents as a node into an object graph, wherein each node is associated with a parent node, except when the node is a root node;
    identifying the root node of each document;
    identifying the path of each node from the node to the node's root node, wherein said path comprises a plurality of nodes that connect the node to the root node;
    identifying a plurality of matching paths, wherein each matching path provides an answer to the user's natural language question, each of said plurality of paths that comprises a discrete path of nodes;
    filtering out paths depending on a set of the user's pre-determined criterion;
    ranking the remaining paths; and
    displaying a selected answer to the user, in response to the ranking and filtering.

10. The method of claim 9 further comprising prompting the user for additional information if a discrete path i.e., an answer to the user's question is not found.

11. The method of claim 10 further comprising in response to the user's answer, ranking the paths and displaying the highest ranking answer to the user.

12. The method of claim 9, wherein each node in graph has an identification number; and each document in the index has an identification number, and the identification numbers of the documents in the graph and the identification numbers of the documents in the search index are identical.

13. The method of claim 9, further comprising displaying a plurality of answers if a discrete path to answer the user's question is not found.

14. The method of claim 9, further comprising ranking the paths at least in part by the search engine which saves the plurality of documents.

15. The method of claim 9, further comprising ranking the paths at least in part by how many nodes existed in the path.

16. The method of claim 9, wherein the paths may be ranked at least in part by the length of the paths.

* * * * *